US012623342B1

(12) United States Patent
Li et al.

(10) Patent No.: US 12,623,342 B1
(45) Date of Patent: May 12, 2026

(54) ROBOT INVERSE KINEMATICS SOLUTION PREDICTION METHOD BASED ON POA-TRANSFORMER-BiGRU-ATTENTION INTEGRATED OPTIMIZATION ALGORITHM

(71) Applicant: ZHEJIANG UNIVERSITY OF SCIENCE AND TECHNOLOGY, Hangzhou City (CN)

(72) Inventors: Guanglei Li, Hangzhou City (CN); Shuguang Li, Hangzhou City (CN); Jianbing Hu, Hangzhou City (CN); Jinglei Zhang, Hangzhou City (CN); Chao Shen, Hangzhou City (CN)

(73) Assignee: ZHEJIANG UNIVERSITY OF SCIENCE AND TECHNOLOGY, Hangzhou City (CN)

( * ) Notice: Subject to any disclaimer, the term of this patent is extended or adjusted under 35 U.S.C. 154(b) by 0 days.

(21) Appl. No.: 19/210,224

(22) Filed: May 16, 2025

(30) Foreign Application Priority Data

Feb. 24, 2025 (CN) .......................... 202510200274.3

(51) Int. Cl.
*B25J 9/16* (2006.01)

(52) U.S. Cl.
CPC .................................... *B25J 9/163* (2013.01)

(58) Field of Classification Search
CPC ... B25J 9/12; B25J 9/163; B25J 9/1633; B25J 9/1641; B25J 9/1653; B25J 9/1664
See application file for complete search history.

(56) References Cited

U.S. PATENT DOCUMENTS

2019/0180493 A1 6/2019 Tong et al.

FOREIGN PATENT DOCUMENTS

CN 102968665 A 3/2013
CN 118199933 A 6/2024

OTHER PUBLICATIONS

Wang et al., "Robot Inverse Kinematics Solution Based on an Improved Whale Optimization Algorithm," Mechanical Transmission, vol. 49, No. 2, 2025, 14 pages.

(Continued)

*Primary Examiner* — Wade Miles
*Assistant Examiner* — Jerrod Irvin Davis
(74) *Attorney, Agent, or Firm* — MUNCY, GEISSLER, OLDS & LOWE, P.C.

(57) ABSTRACT

A robot inverse kinematics solution prediction method based on a POA-Transformer-BiGRU-Attention integrated optimization algorithm is disclosed. The method includes: initializing of a POA, positions evaluation and updating, training a Transformer to generate output features, processing a BiGRU and applying an Attention Mechanism, and global optimization. The evaluating and updating positions include: Evaluating $P_i$ using a fitness function, updating the individual positions, and acquiring renewed positions $P_i^{new}$.

The BiGRU and Attention Mechanism includes: Feeding the output features into a BiGRU to obtain final hidden states, and then applying an attention mechanism to compute the weighted summation of these states. Subsequently, generating predicted inverse kinematics solution based on the weighted summation results and evaluating the accuracy of the predictions using an objective function, and determining a global optimal solution. The proposed algorithm demonstrated strong robustness and superior prediction accuracy under various working conditions and noise disturbances.

6 Claims, 4 Drawing Sheets

(56) References Cited

OTHER PUBLICATIONS

Alkhodary et al., "Kinematics Transformer: Solving The Inverse Modeling Problem of Soft Robots using Transformers," arXiv:2211. 06643v1 [cs.RO] Nov. 12, 2022, 7 pages.

Nie et al., "Inverse kinematics of 7-Dof robot based on Pelican Optimization Algorithm," Third International Conference on Control and Intelligent Robotics, 2023, 5 pages.

S1: Initialize the POA Algorithm initializing a POA by randomly generating individual robot positions $P_i$;

S2: Evaluate and Update Positions evaluating and updating the individual robot positions $P_i$ using a fitness function to obtain updated positions $P_i^{new}$;

S3: Train Transformer Model defining an input data $Xi = P_i^{new}$, then training the Xi through a Transformer model to generate output features $Z'$;

S4: Process Data with BiGRU and Attention processing the output features $Z'$ using a BiGRU to obtain final hidden states, and applying an attention mechanism to compute weighted summation results z

S5: Generate and Optimize Solutions generating predicted inverse kinematics solutions based on the weighted summation results z, evaluating an accuracy of the inverse kinematics solutions using an objective function, and determining a global optimal solution

Fig. 1

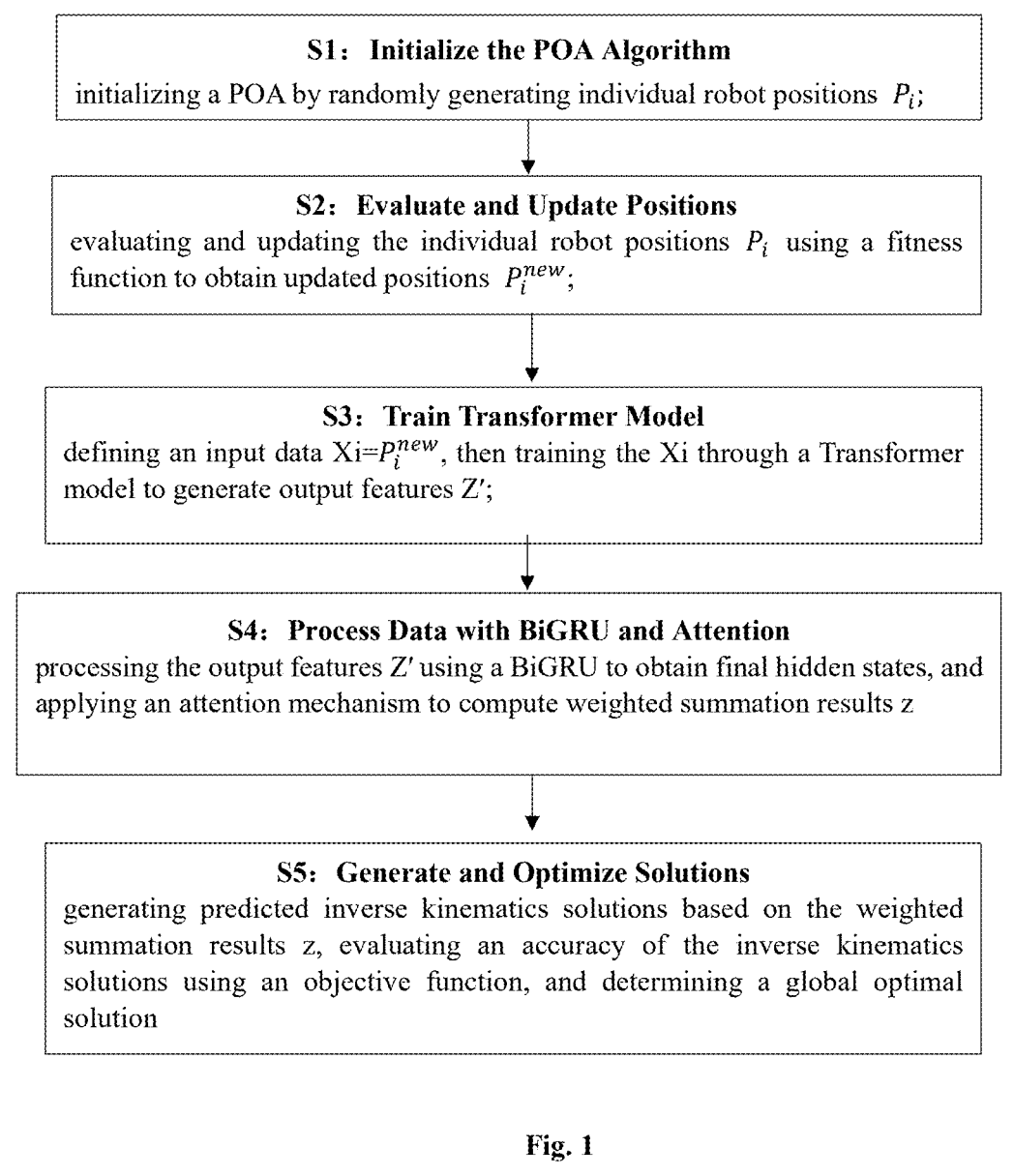

ROBOT INVERSE KINEMATICS SOLUTION PREDICTION METHOD BASED ON POA-TRANSFORMER-BiGRU-ATTENTION INTEGRATED OPTIMIZATION ALGORITHM

CROSS-REFERENCE TO RELATED APPLICATION

This application claims the benefit and priority of Chinese Patent Application No. 202510200274.3, filed Feb. 24, 2025, the disclosures of which are incorporated by reference herein in their entirety.

TECHNICAL FIELD

The present invention relates to a field of robotics technology, particularly to a robot inverse kinematics solution prediction method based on the POA-Transformer-BiGRU-Attention integrated optimization algorithm, specifically designed to enhance motion control precision and robustness for multi-degree-of-freedom robots under complex working conditions.

BACKGROUND TECHNOLOGY

Multi-degree-of-freedom (DOF) robots are widely used in industrial manufacturing, medical applications, service robotics, and other fields, executing precision tasks such as welding, assembly, and surgery. However, the core challenge in motion control for multi-DOF robots lies in solving the inverse kinematics problem—determining the joint angles required to achieve a target end-effector position and orientation. Due to the complex geometric structures and multi-solution nature of multi-DOF robots, inverse kinematics exhibits highly nonlinear characteristics. Traditional analytical and numerical methods, while effective in simple applications, struggle to deliver precise, stable, and real-time solutions in complex scenarios and high-DOF systems.

The complexity of inverse kinematics for multi-DOF robots stems from its strong nonlinearity and multiple-solution nature. The relationship between the end-effector position and joint angles often lacks a closed-form analytical expression, making the problem notoriously difficult to solve. Furthermore, robotic systems frequently yield multiple potential solutions, some of which may violate physical constraints or exceed joint motion limits. Conventional methods rely on intricate mathematical derivations or iterative algorithms, often trapping solutions in local optima and failing to guarantee global optimality. These limitations are exacerbated in high-dimensional nonlinear systems, where convergence speed and computational efficiency degrade significantly.

Traditional inverse kinematics methods can be categorized into analytical methods and iterative methods. Analytical methods depend on mathematical models of robotic structures to derive closed-form solutions, but they are restricted to specific robot architectures and poorly suited for non-standard or complex systems. Iterative methods (e.g., the Newton-Raphson method) are more generalizable but require careful initialization to avoid local optima and suffer from slow convergence in high-dimensional nonlinear spaces, along with insufficient real-time performance for dynamic task execution. Furthermore, due to the non-unique nature of inverse kinematics solutions, conventional methods cannot optimize overall energy consumption during robotic arm trajectory planning nor prevent redundant motions and frequent start-stop cycles. These technical shortcomings collectively degrade system efficiency while accelerating hardware wear. Recent efforts integrating machine learning and deep learning approximate high-dimensional nonlinear mappings using large datasets. However, these approaches heavily depend on data distribution, exhibit limited generalization capabilities, and underperform in scenarios demanding high real-time responsiveness. Existing methods thus remain inadequate for solving inverse kinematics in complex multi-DOF robotic systems.

SUMMARY

To address limitations of traditional methods in achieving precise, stable, and real-time solutions for complex scenarios and high-DOF systems, the present invention provides a robot inverse kinematics solution prediction method based on the POA-Transformer-BiGRU-Attention integrated optimization algorithm.

The method comprises the following steps:

S1: initializing a Pelican Optimization Algorithm (POA) by randomly generating individual robot positions $P_i$;

S2: evaluating and updating the individual robot positions $P_i$ using a fitness function to obtain updated positions $$P_i^{new};$$

S3: defining an input data $$X_i = P_i^{new},$$

and processing the $X_i$ through a Transformer-BiGRU-Attention algorithm to generate a target joint angle;

S4: evaluating an accuracy of the target joint angle using an objective function constrained by physical joint limits, and adjust robotic joint angles to ensure precise end-effector positioning and orientation;

S5: converting the target joint angles into servo motor control signals in a form of angular velocity, angular acceleration or displacement, then transmitting via bus or industrial Ethernet interface to robotic joint drive units for real-time speed regulation and precise position control.

Optionally, the robot includes a sensor feedback module collecting real-time data from: actual end-effector position (via vision or laser measurement); current joint angles; or encoder readings and accelerometer or IMU (Inertial Measurement Unit) orientation feedback.

Optionally, the feedback information is differenced with the current predicted inverse solution to generate residual terms as model inputs, enabling closed-loop adaptive optimization and online error compensation.

Optionally, the algorithm incorporates boundary detection capability, which automatically re-optimizes the control path when predicted solutions approach physical joint limits, thereby preventing joint overtravel or mechanical collisions.

Optionally, the optimization module forms a closed-loop interaction with the feedback system by: feeding prediction errors back to the model input in real-time, dynamically adjusting model weights through the POA algorithm, and enabling online learning and optimization.

Optionally, the model leverages historical learning experience to autonomously avoid potentially conflicting poses near joint limits, thereby effectively mitigating wear and failure risks caused by mechanical impacts and jamming.

Optionally, the Transformer-BiGRU-Attention algorithm can be further integrated with TCN (Temporal Convolutional Network) to form a TCN-Transformer-BiGRU-Attention hybrid algorithm, where: The TCN extracts time-series features from joint motion data, the BiGRU captures forward-backward state dependencies, and the attention mechanism enhances the response weighting of critical posture information.

Optionally, the step S3 further comprises:

S31: training the Transformer model: defining an input data $$X_i = P_i^{new},$$

then training the $X_i$ through a Transformer model to generate output features Z';

S32: processing the output features Z' using a BiGRU (Bidirectional Gated Recurrent Unit) to obtain final hidden states or capture temporal dependencies, and applying an attention mechanism to compute weighted summation results z;

S33: generating predicted inverse kinematics solutions based on the weighted summation results z, evaluating an accuracy of the inverse kinematics solutions using an objective function, and determining a global optimal solution.

Optionally, in the Step S1 (Initialization of Robot Positions):

setting a number of the robot as N and a maximum iteration counts as $T_{max}$;

initializing individual robot positions as: $P_i=\{x_{i1}, x_{i2}, \ldots, x_{id}\}(i=1,2, \ldots, N)$, where $x_{id}$ represents a value of a i-th data point in a d-th feature dimension.

Optionally, in the step S2 (Position Evaluation and Update):

evaluating the $P_i$ using the fitness function $f(P_i)$=evaluate $(P_i)$;

updating the $P_i$ with a formula:

$$P_i^{new} = P_i + r \cdot (P_{best} - P_i) + \varepsilon,$$

where $P_{best}$ denotes a current best position, r is a random number, and $\varepsilon$ is a perturbation term to enhance search diversity.

Optionally, in the Step S31 (Transformer Model Processing):

the Transformer model, processing an input sequence $X=[x_1, x_2, \ldots, x_i]$ using a self-attention mechanism:

$$Q=XW_Q;$$

$$K=XW_K;$$

$$V=XW_V;$$

where Q is a query matrice, K is a key matrice, and V is a value matrice, and $W_Q$ is a query weight matrice, $W_K$ is a key weight matrice, $W_V$ is a value weight matrice, and $x_i$ represents an i-th element in the input sequence; computing an attention weight matrix via scaled dot-product:

$$A = softmax\left(\frac{QK^T}{\sqrt{d_k}}\right);$$

where A is the attention weight matrix and $d_k$ is a dimension of K;

generating an output matrix Z=AV, and applying a ReLU (Rectified Linear Unit) activation to obtain the output features Z'=RELU(Z).

Optionally, in the Step S32 (BiGRU and Attention Mechanism):

the BiGRU, taking the Z' as an input, wherein the BiGRU comprises two GRU layers, one is used for processing a forward sequence and the other is used for processing on is a backward sequence;

for each time step t, updating a forward hidden state $\hat{h}_t$ and a backward hidden state $h_t$;

$$\hat{h}_t = \tanh(W_h \cdot x_t + U_h \cdot (r_t \odot h_{t-1})),$$

$$h_t = (1-r_t) \odot h_{t-1} + z_t \odot \hat{h}_t;$$

$$z_t = \sigma(W_z \cdot x_t + U_z \cdot h_{t-1});$$

$$r_t = \sigma(W_r \cdot x_t + U_r \cdot h_{t-1});$$

where: $x_t$ is an output of Z' at the timestep t; $W_h$ represents a weight matrix associated with candidate hidden states; $W_z$ represents a weight matrix associated with an update gate; $W_r$ represents a weight matrix associated with a reset gate; $U_h$, $U_z$, $U_r$ are weight matrices; $r_t$ is the reset gate; $h_{t-1}$ represents the hidden state at the timestep t−1; $z_t$ is the update gate; o represents a sigmoid function.

the BiGRU processes sequences in two directions to respectively obtain a forward hidden state and a backward hidden state:

$$h_t^{forward} = GRU_{forward}(x_t);$$

$$h_t^{backward} = GRU_{backward}(x_t);$$

where $$h_t^{forward}$$

represents the forward hidden state and $$h_t^{backward}$$

represents the backward hidden state, a final hidden state $$h_t'$$

is obtained based on the forward hidden state and the backward hidden state:

$$h'_t = \left[h_t^{forward}; h_t^{backward}\right].$$

calculating energy scores:

$$e_t = \text{score}(h'_t, h_{context});$$

normalizing attention weights:

$$\alpha_t = \frac{\exp(e_t)}{\sum_{j=1}^{T} \exp(e_j)};$$

computing the weighted summation results based on the $\alpha_t$ and $h_t$ $$z = \sum_{t=1}^{T} \alpha_t \cdot h_t;$$

where $e_t$ represents an energy value at a timestep t; $h_{context}$ represents a context vector; $\alpha_t$ represents an attention weight at a timestep t; $e_j$ represents an energy value at a timestep j; T represents a total number of timesteps in a sequence.

Optionally, in the step S33 (Objective Function and Global Optimization):

calculating the objective function $f(\theta)$ as:

$$f(\theta)=\omega_1 \cdot E_{position}(\theta)+\omega_2 \cdot E_{orientation}(\theta)+\omega_3 \cdot C(\theta)+\omega_4 \cdot E_{prediction}(\theta);$$

where $\theta$ is a joint angle vector, $\omega_1$, $\omega_2$, $\omega_3$, $\omega_4$ are weighting coefficients, $E_{position}$ is an position error; $E_{orientation}$ is an orientation error; $E_{prediction}$ is a prediction error, $C(\theta)$ is a joint limit constraint;

wherein the position error is calculated as: $E_{position}(\theta)=\|P_{desired}-P_{actual}(\theta)\|_2$; where $P_{desired}$ is a desired end-effector position vector; $P_{actual}(\theta)$ is an actual end-effector position vector;

wherein the prediction error is calculated as follows:

$$E_{prediction}(\theta)=\|\theta_{pred}-\theta_{actual}\|_2$$

where $\theta_{pred}$ is a predicted inverse kinematics solution from the integrated Transformer-BiGRU-Attention model; $\theta_{actual}$ is a current solution provided by the POA; $\theta$ is a joint angle vector, and is an optimization target.

wherein the orientation error is calculated as: $E_{orientation}(\theta)=\|R_{desired}-R_{actual}(\theta)\|_F$; where $R_{desired}$ is a desired end-effector rotation matrix; $R_{actual}(\theta)$ is an actual end-effector rotation matrix;

wherein the joint limit constraint is calculated as:

$$C(\theta) = \sum_{i=1}^{6} \left[\text{penalty} \cdot \max(0, \theta_i - \theta_{i,max})^2 + \max(0, \theta_{i,min} - \theta_i)^2\right];$$

where penalty is constraint coefficient, $\theta_i$ is a i-th allowable rotation angle; $\theta_{i,max}$ is a maximum allowable rotation angle for a i-th parameter; $\theta_{i,min}$ is a minimum allowable rotation angle for a i-th parameter, wherein if $\theta_i$ exceeds a defined robotic arm range $\theta_{i,limit}$, a penalty term is applied to enforce convergence to valid search space;

minimizing a value of the objective function $f(\theta)$ via iterative parameter adjustment and POA optimization to ensure the accuracy of the inverse kinematics solutions and obtain the global optimum solution.

Optionally, to integrate global search capability with deep temporal feature modeling, the objective function incorporates one or more of the following components:

position error: computed between the desired end-effector position vector and the actual end-effector position vector;

orientation error: derived from the desired end-effector rotation matrix versus actual rotation matrix;

joint limit constraints; and prediction error.

Optionally, the multi-degree-of-freedom robot may be a 6-DOF robot, which comprises an end-effector connection interface, and motor drivers integrated at each joint.

Optionally, the optimized inverse kinematics solution is transmitted as real-time control commands directly to the 6-DOF robot's joint motor drivers, enabling the end-effector to achieve target pose.

The present invention may demonstrate powerful global search capability and rapid convergence by simulating the hunting behavior of pelicans. The inverse kinematics solution for multi-degree-of-freedom robots involves complex interactions among multiple joints. Furthermore, the Transformer architecture effectively processes long-sequence data, utilizing self-attention mechanisms to capture long-range dependencies and enhance feature extraction. Simultaneously, the BiGRU improves comprehension of temporal dynamic variations through bidirectional (forward and backward) information processing. The attention mechanism enables the model to dynamically focus on critical features, optimizing feature selection and thereby improving prediction accuracy.

Optionally, by leveraging the long-term memory characteristics of BiGRU and the dynamic weight allocation mechanism of Attention, the model can autonomously adapt to different working modes and load variations, maintaining high system robustness while reducing the frequency of manual maintenance and the rate of error accumulation.

Alternatively, the POA algorithm is employed to optimize the inverse kinematics solution space within a multi-objective function framework. By incorporating "total path energy consumption" or "aggregate motor power draw" as penalty terms, the algorithm suppresses redundant oscillations and high-inertia motions, ultimately selecting low-energy solutions as the final output.

The proposed algorithm demonstrates strong robustness and superior prediction accuracy across various operating conditions and noise disturbances, achieving higher precision in inverse kinematics solutions. Particularly in high-degree-of-freedom systems and complex noisy environments, it rapidly converges to the global optimal solution, effectively circumventing the local optima traps inherent in traditional methods.

The POA-Transformer-BiGRU-Attention integrated optimization algorithm holds significant application value in industrial manufacturing and medical robotics. By enabling precise inverse kinematics prediction, robots can perform high-precision operations in complex environments, such as: precision assembly, and minimally invasive surgery, thereby substantially enhancing production efficiency and operational safety.

It should be understood that the content described in this section is not intended to identify key or essential features of the embodiments of the present invention, nor is it intended to limit the scope of the invention. Other features of the invention will become readily apparent through the following description.

BRIEF DESCRIPTION OF DRAWINGS

The drawings are included to aid understanding and do not limit the scope of the invention:

FIG. 1 is a flowchart of the proposed method;

DETAILED DESCRIPTION

Figure 2:
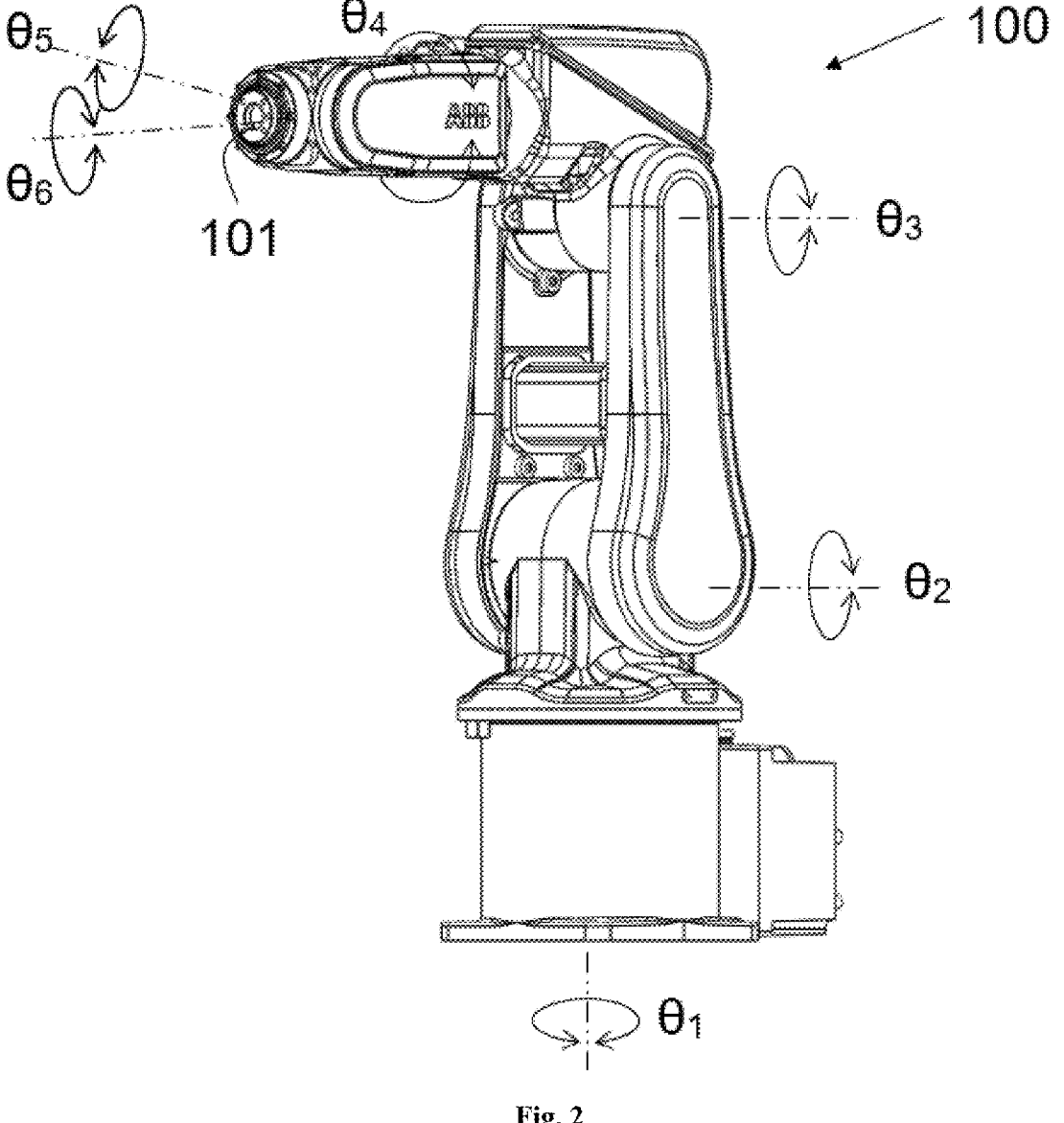
FIG. 2 is a schematic of a 6-DOF industrial robot.

The following exemplary embodiments, with reference to the accompanying drawings, are provided to facilitate understanding of the present invention. These examples include various details and should be considered illustrative only. Accordingly, those skilled in the art will recognize that modifications may be made to the described embodiments without departing from the scope and spirit of the invention. For clarity and conciseness, descriptions of well-known functions and structures are omitted.

As shown in FIG. 1, the proposed method comprises the following steps:

S1: Initialization of the POA Algorithm

Initialize the Pelican Optimization Algorithm (POA) by randomly generating individual robot positions $P_i$:

Set the number of robots N and maximum iterations $T_{max}$.

Initialize robot positions as: $P_i=\{x_{i1},x_{i2}, \ldots x_{id},\}$ (i=1,2, ..., N) where $x_{id}$ denotes the value of the i-th data point in the d-th feature dimension.

S2: Position Evaluation and Update

Evaluate and update $P_i$ using a fitness function to obtain $$P_i^{new}:$$

Fitness evaluation: $f(P_i)=evaluate(P_i)$

Position update formula:

$$P_i^{new} = P_i + r \cdot (P_{best} - P_i) + \varepsilon] \text{ where } P_{best}$$

is the current best position, r is a random number, and ε is a perturbation term for search diversity.

S3: Transformer Model Training

Define input data $$X_i = P_i^{new}.$$

Process $X_i$ through the Transformer model to generate output features Z'.

Self-Attention Mechanism:

For input sequence $X=[x_1,x_2, \ldots, x_i]$, compute: $Q=XW_Q$, $K=XW_K$, $V=XW_V$ where $W_Q$, $W_K$, and $W_V$ are weight matrices for query, key, and value.

Attention Weights:

$$A = \text{softmax}\left(\frac{QK^T}{\sqrt{d_k}}\right)$$

where $d_k$ is the dimension of K.

Output Features:

$$Z=AV, Z'=RELU(Z)$$

S4: BiGRU Processing and Attention Mechanism

The Bidirectional Gated Recurrent Unit (BiGRU) algorithm processes the Transformer (Transformer is a deep learning model architecture originally developed for Natural Language Processing (NLP) tasks) trained input data Xi to derive final hidden states, which are then combined with an attention mechanism to compute weighted summation results. It should be noted that:

The output features Z' from the Transformer are fed as input to the BiGRU, which consists of two GRU (Gated Recurrent Unit) layers, one processing the sequence in the forward direction and the other in the backward direction.

For each timestep t, the BiGRU updates forward hidden state $\hat{h}_t$ and a backward hidden state $h_t$.

BiGRU Equations (for time step t):

$$\hat{h}_t=\tanh (W_h \cdot x_t + U_h \cdot (r_t \odot h_{t-1}),$$

$$h_t=(1-z_t) \odot h_{t-1}+z_t \odot h_t,$$

where $$z_t=\sigma(W_z \cdot x_t + U_z \cdot h_{t-1}), r_t=\sigma(W_r \cdot x_t + U_r \cdot h_{t-1}).$$

Forward/Backward states:

forward hidden state:

$$h_t^{forward} = GRU_{forward}(x_t);$$

backward hidden state:

$$h_t^{backward} = GRU_{backward}(x_t).$$

Final Hidden State:

$$h_t' = \left[h_t^{forward}; h_t^{backward}\right]$$

Attention-Weighted Results:

$$\alpha_t = \frac{\exp(e_t)}{\sum_{j=1}^{T}\exp(e_j)}, \text{ where } e_t = \text{score}(h_t', h_{context}); z = \sum_{t=1}^{T}\alpha_t \cdot h_t$$

S5: Objective Function and Global Optimization

Generate predicted inverse solutions and optimize via the objective function:

Objective Function:

$$f(\theta)=\omega_1 \cdot E_{position}(\theta)+\omega_2 \cdot E_{orientation}(\theta)+\omega_3 \cdot C(\theta)+ \omega_4 \cdot E_{prediction}(\theta)$$

where:

Position Error:

$$E_{position}(\theta)=\|P_{desired}-P_{actual}(\theta)\|_2$$

Orientation Error:

$$E_{orientation}(\theta)=\|R_{desired}-R_{actual}(\theta)\|_F$$

Joint Limit Constraint:

$$C(\theta) = \sum_{i=1}^{6}\left[\text{penalty}\cdot\max(0, \theta_i - \theta_{i,max})^2 + \max(0, \theta_{i,min} - \theta_i)^2\right]$$

Prediction Error:

$$E_{prediction}(\theta)=\|\theta_{pred}-\theta_{actual}\|_2$$

Iterative Optimization:

Adjust model parameters and POA strategies to minimize (f (\theta)), ensuring the global optimality.

Hidden layer: 30 nodes.

Max iterations item$_{max}$: 200.

Warning threshold $R_2$: A random value within (0,1], safety factor: 0.8.

Results:

The inverse kinematics error comparison for six poses is shown in Table 1. Ten points were randomly selected within the reachable workspace of the industrial robot. With the world coordinate system as reference, the Cartesian coordinates corresponding to these points were recorded. The POA-Transformer-BiGRU-Attention integrated learning algorithm proposed in this paper was used to calculate the inverse solutions and corresponding poses, and the inverse kinematics errors were computed (unit: mm). The results are presented in Table 1.

TABLE 1

Validation of inverse kinematics solutions for 10 fixed poses (Base coordinate system).

| | Target position | | | Inverse solution joint angle predicted by our algorithm | | | | | | Inverse solution position (mm) | | | Inverse solution error (%) | | |
|---|---|---|---|---|---|---|---|---|---|---|---|---|---|---|---|
| No. | px | py | pz | 1 | 2 | 3 | 4 | 5 | 6 | px | py | pz | px' | py' | pz' |
| 1 | 656.31 | −548.59 | 620.08 | −44.17 | −26.07 | 55.04 | −86.47 | −14.63 | 56.04 | 669.4362 | −482.7592 | 620.08 | 0.02 | −0.12 | 0 |
| 2 | 650.95 | −543.8 | 610.35 | −44.63 | −26.22 | 55.61 | −88.54 | −15.87 | 57.71 | 670.4785 | −543.8 | 592.0395 | 0.03 | 0 | −0.03 |
| 3 | 641.04 | −534.96 | 593.09 | −45.43 | −26.48 | 56.59 | −92.07 | −17.98 | 60.58 | 641.04 | 540.3096 | 593.09 | 0 | 0.01 | 0 |
| 4 | 630.78 | −525.89 | 576.15 | −46.18 | −26.72 | 57.52 | −95.41 | −19.98 | 63.29 | 624.4722 | −525.89 | 564.6368 | −0.01 | 0 | −0.02 |
| 5 | 620.14 | −516.68 | 559.55 | −46.91 | −26.96 | 58.42 | −98.64 | −21.92 | 65.92 | 620.14 | −527.0136 | 559.55 | 0 | 0.02 | 0 |
| 6 | 609.11 | −507.34 | 543.27 | −47.58 | −27.17 | 59.25 | −101.62 | −23.7 | 68.35 | 615.2011 | −507.34 | 532.4046 | 0.01 | 0.01 | −0.02 |
| 7 | 597.67 | −497.92 | 527.32 | −48.25 | −27.39 | 60.08 | −104.6 | −25.49 | 70.77 | 597.67 | −512.8576 | 527.32 | 0 | 0.03 | 0 |
| 8 | 585.83 | −488.43 | 511.7 | −48.88 | −27.59 | 60.85 | −107.38 | −27.15 | 73.02 | 574.1134 | −488.43 | 506.583 | −0.02 | 0 | −0.01 |
| 9 | 573.59 | −478.9 | 496.43 | −49.49 | −27.79 | 61.61 | −110.13 | −28.8 | 75.26 | 585.0618 | −478.9 | 476.5728 | 0.02 | 0 | −0.04 |
| 10 | 560.94 | −469.33 | 481.51 | −50.11 | −27.99 | 62.37 | −112.85 | −30.43 | 77.47 | 560.94 | −474.0233 | 476.6949 | 0 | 0.01 | −0.01 |

Experimental Validation

To validate the performance of the proposed algorithm, a 6-DOF (six-degree-of- freedom) industrial robot was employed to verify the accuracy of the POA-Transformer-BiGRU-Attention hybrid optimization algorithm in solving inverse kinematics for the 6-DOF industrial robot. As shown in FIG. 2, the 6-DOF industrial robot 100 features an end-effector connection interface 101, where the end-effector can be configured according to specific application scenarios.

The robot kinematic data is taken as input, including time-series position information and target poses. The input to this algorithm consists of a dataset containing position information and target poses, with population size N and maximum iteration count Tmax as parameters, ultimately returning the optimal prediction result $R_{best}$.

A Temporal Convolutional Network (TCN) is employed to extract temporal features from the robot's historical motion states, and these temporal features are used to adjust the response weights of pose information.

Pose parameters: End-effector pose $T(p_x,p_y,p_z,o_x,o_y,o_z,a_x, a_y,a_z,n_x,n_y,n_z)$, where: $p_x,p_y,p_z$: positions along x/y/z axes. $o_x,o_y,o_z$: rotation angles around x/y/z axes. $a_x,a_y,a_z$: direction vectors along x/y/z axes. $n_x,n_y,n_z$: normal vectors along x/y/z axes.

Joint angles: $\theta_1,\theta_2,\theta_3,\theta_4,\theta_5,\theta_6$, mapped to Cartesian space via $F(\theta_1,\theta_2,\theta_3,\theta_4,\theta_5,\theta_6)$.

Data split: 5,000 samples (2,500 randomly selected for training, 600 reserved for testing).

POA Configuration:

Input/output nodes: 12 (pose parameters)/6 (joint angles). Activation function: Sigmoid.

As shown in Table 1, the POA-Transformer-BiGRU-Attention integrated learning algorithm achieves a maximum inverse kinematics solution error of ≤0.03% for the 6-DOF robot, meeting the accuracy requirements for general end-effector poses. The iteration count and convergence curve of the algorithm are illustrated in FIG. 3.

Figure 3:
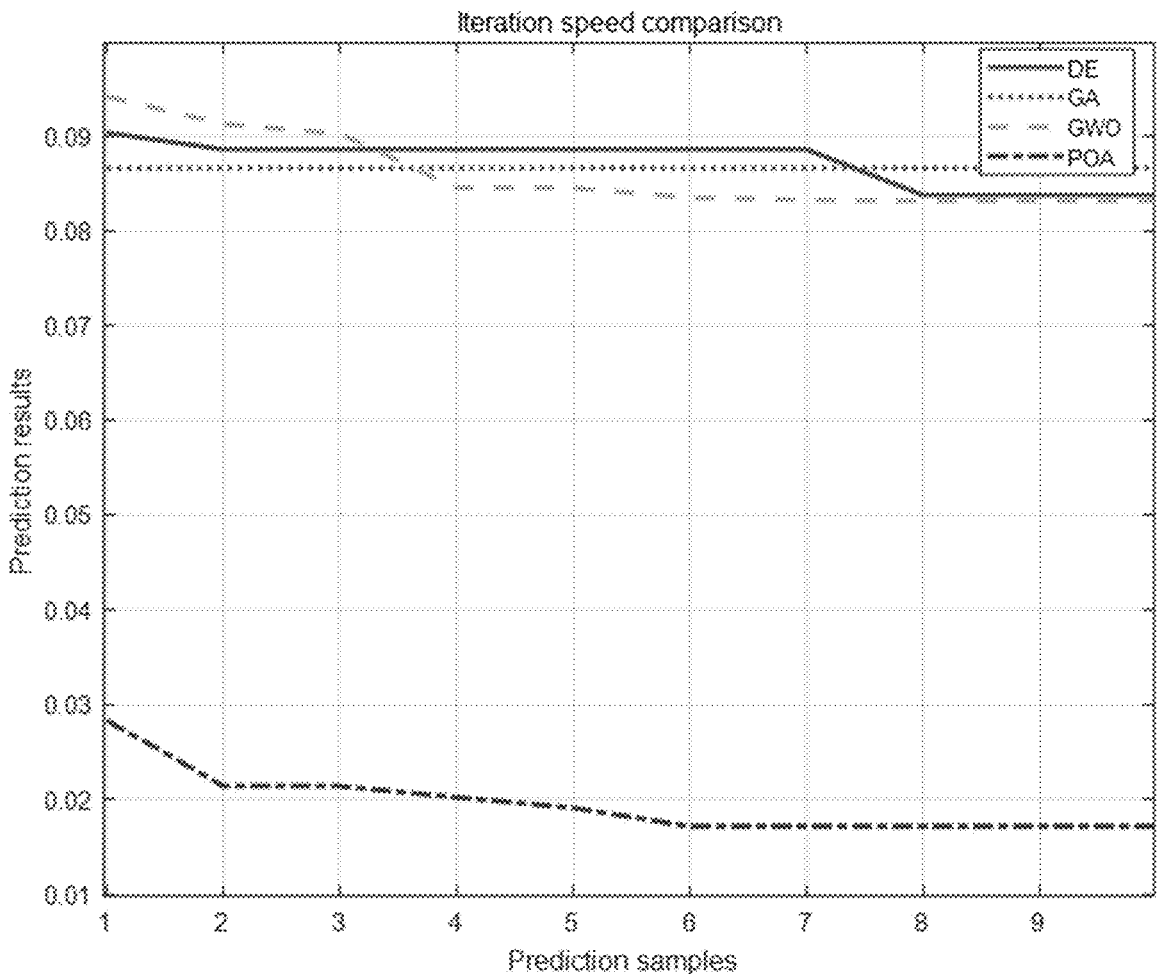
FIG. 3 is a iteration comparison between the POA-Transformer-BiGRU algorithm and GA, DE, PWO algorithms.
Figure 4:
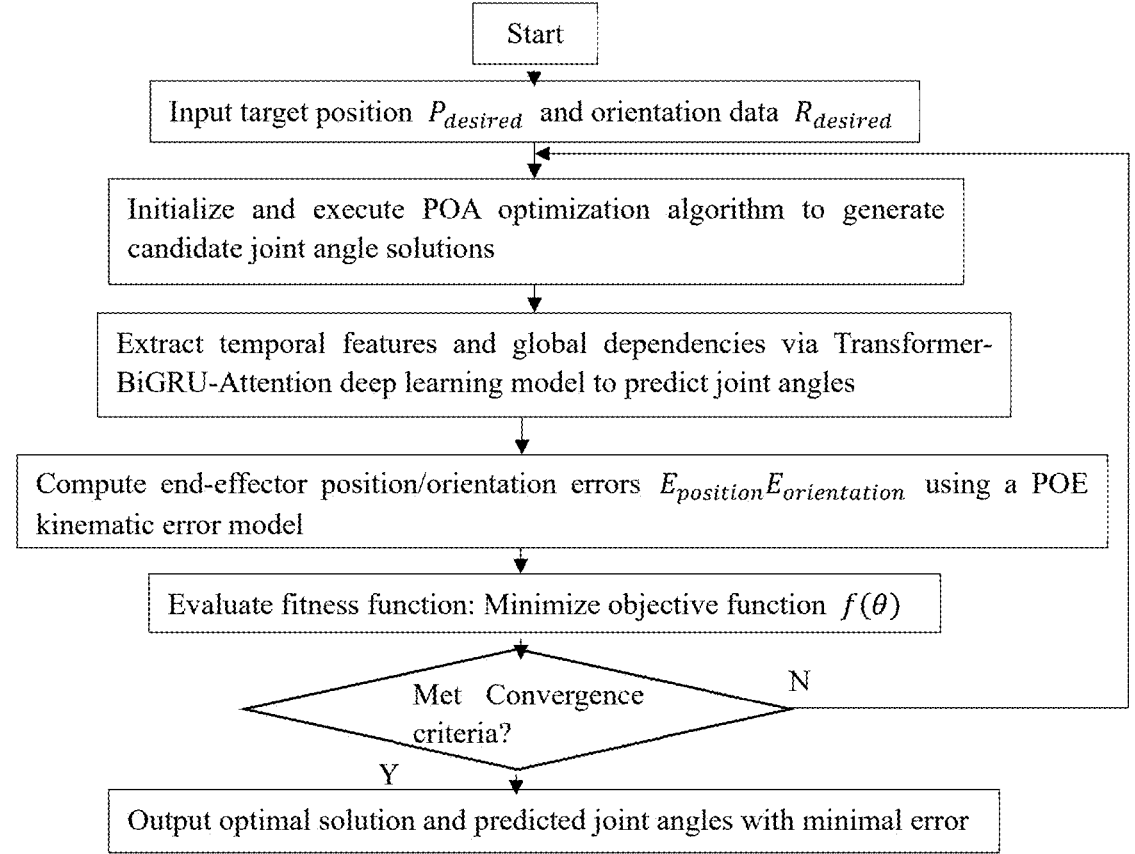
FIG. 4 is another flowchart of the proposed method.

FIG. 3 demonstrates that the proposed algorithm rapidly converges to an optimal solution after iterations commence. Compared to standalone algorithms (Genetic Algorithm (GA), Differential Evolution (DE), Grey Wolf Optimizer (GWO)), our method exhibits lower fitness values, faster convergence, stable curves, and superior real-time performance.

Root Mean Square Error (RMSE) is used to quantify the deviation between predicted and actual values:

$$RMSE(X_i, X_i') = \sqrt{\frac{1}{n}\sum_{i=1}^{n}(X_i - X_i')^2}$$

where $X_i$ denotes the actual value, $$X_i'$$

is the predicted value, and n is the total number of observations; RMSE( $$RMSE(X_i, X_i')$$

) is the Root Mean Square Error.

The POA-Transformer-BiGRU-Attention algorithm was trained on 2,500 datasets and tested on 10 poses. The results show that: Prediction errors fluctuate within 5 millimeters (mm), falling within the acceptable probabilistic error range of intelligent optimization algorithms. The hybrid algorithm achieves higher prediction stability and accuracy, validating the superior precision of the proposed method.

Furthermore, this embodiment additionally verifies the variation curves of position and orientation errors at the robot's end-effector TCP before and after compensation. The results demonstrate that after compensation, the position errors of the end-effector in the X, Y, and Z directions are all significantly reduced. Specifically, the maximum error in the X direction is −2.90541 mm, in the Y direction is 1.5025 mm, and in the Z direction is −1.3025 mm, with particularly outstanding performance in the Z direction, indicating the high efficiency and accuracy of the proposed integrated algorithm in position compensation. Further, the compensation effect on orientation errors is equally remarkable, with error fluctuations in Yaw (yaw angle), Pitch (pitch angle), and Roll (roll angle) all substantially reduced. After compensation, the maximum Yaw error is −7.3513 mm, maximum Pitch error is −3.3483 mm, and maximum Roll error is 10.3236 mm. The compensated curves align much closer to the true values, especially demonstrating superior calibration capability in Yaw and Pitch.

While specific embodiments of the invention have been described above, its scope of protection is not limited to these examples. Any modifications or substitutions within the technical scope disclosed by the invention shall be encompassed in its protection. The scope of the invention shall be defined by the appended claims.

What is claimed is:

1. A robot inverse kinematics solution prediction method based on a POA-Transformer-BiGRU-Attention integrated optimization algorithm, wherein the method comprises:

initializing a POA by randomly generating individual robot positions $P_i$;

wherein the generating individual robot positions $P_i$ comprises:

setting a number of the robot as N and a maximum iteration counts as $T_{max}$;

initializing individual robot positions as: $P_i=\{x_{i1}, x_{i2}, \ldots x_{id}\}$ (i=1,2, . . . , N), where $x_{id}$ represents a value of a i-th data point in a d-th feature dimension;

evaluating and updating the individual robot positions $P_i$ using a fitness function to obtain updated positions $$P_i^{new};$$

defining an input data $$X_i = P_i^{new},$$

then training the $X_i$ through a Transformer model to generate output features Z';

processing the output features Z' using a BiGRU to obtain final hidden states, and applying an attention mechanism to compute weighted summation results z; and generating predicted inverse kinematics solutions based on the weighted summation results z, evaluating an accuracy of the inverse kinematics solutions using an objective function, and determining a global optimal solution;

wherein the evaluating an accuracy of the inverse kinematics solutions using an objective function comprises: calculating the objective function $f(\theta)$ as:

$$f(\theta)=\omega_1 \cdot E_{position}(\theta)+\omega_2 \cdot E_{orientation}(\theta)+\omega_3 \cdot C(\theta)+\omega_4 \cdot E_{prediction}(\theta);$$

where $\theta$ is a joint angle vector, $\int_1$, $\omega_2$, $\omega_3$, $\omega_4$ are weighting coefficients, $E_{position}$ is an position error; $E_{orientation}$ is an orientation error; $E_{prediction}$ is a prediction error, $C(\theta)$ is a joint limit constraint;

wherein the position error is calculated as: $E_{position}(\theta)=\|P_{desired}-P_{actual}(\theta)\|_2$; where $P_{desired}$ is a desired end-effector position vector; $P_{actual}(\theta)$ is an actual end-effector position vector;

wherein the orientation error is calculated as: $E_{orientation}(\theta)=\|R_{desired}-R_{actual}(\theta)\|_F$; where $R_{desired}$ is a desired end-effector rotation matrix; $R_{actual}(\theta)$ is an actual end-effector rotation matrix;

wherein the joint limit constraint is calculated as:

$$C(\theta) = \sum_{i=1}^{6} \left[ penalty \cdot \max(0, \theta_i - \theta_{i,max})^2 + \max(0, \theta_{i,min} - \theta_i)^2 \right];$$

where penalty is constraint coefficient, $\theta_i$ is a i-th allowable rotation angle; $\theta_{i,max}$ is a maximum allowable rotation angle for a i-th parameter; $\theta_{i,min}$ is a minimum allowable rotation angle for a i-th parameter, wherein if $\theta_i$ exceeds a defined robotic arm range $\theta_{i,limit}$, a penalty term is applied to enforce convergence to valid search space;

minimizing a value of the objective function $f(\theta)$ via iterative parameter adjustment and POA optimization to ensure the accuracy of the inverse kinematics solutions and obtain the global optimum solution.

2. The method according to claim 1, wherein the evaluating and updating the individual robot positions $P_i$ using a fitness function to obtain updated positions $$P_i^{new}$$

comprises:

evaluating the $P_i$ using the fitness function $f(P_i)=$evaluate $(P_i)$;

updating the $P_i$ with a formula $$P_i^{new} = P_i + r \cdot (P_{best} - P_i) + \varepsilon,$$

where $P_{best}$ denotes a current best position, r is a random number, and $\varepsilon$ is a perturbation term to enhance search diversity.

3. The method according to claim 2, wherein the defining an input data $$X_i = P_i^{new},$$

13

14 then training the $X_i$ through a Transformer model to generate output features Z' comprises:

the Transformer model, processing an input sequence $X=[x_1, x_2, \ldots, x_i]$ using a self-attention mechanism:

$Q=XW_Q;$ $K=XW_K;$ $V=XW_V;$ where Q is a query matrice, K is a key matrice, and V is a value matrice, and $W_Q$ is a query weight matrice, $W_K$ is a key weight matrice, $W_V$ is a value weight matrice, and $x_i$ represents an i-th element in the input sequence;

computing an attention weight matrix via scaled dot-product:

$$A = softmax\left(\frac{QK^T}{\sqrt{d_k}}\right);$$

where A is the attention weight matrix and $d_k$ is a dimension of K;

generating an output matrix Z=AV, and applying a ReLU activation to obtain the output features Z'=RELU(Z).

4. The method according to claim 3, wherein the processing the output features Z' using a BiGRU to obtain final hidden states comprises:

the BiGRU, taking the Z' as an input, wherein the BiGRU comprises two GRU layers, one is used for processing a forward sequence and the other is used for processing on is a backward sequence;

for each time step t, updating a forward hidden state $\hat{h}_t$ and a backward hidden state $h_t$:

$\hat{h}_t=\tan h(W_h \cdot x_t + U_h \cdot (r_t \odot h_{t-1}))$, $h_t=(1-_t)\odot h_{t-1}+z_t\odot \hat{h}_t;$ $z_t=\sigma(W_z \cdot x_t + U_z \cdot h_{t-1});$ $r_t=\sigma(W_r \cdot x_t + U_r \cdot h_{t-1});$ where: $x_t$ is an output of Z' at the timestep t; $W_h$ represents a weight matrix associated with candidate hidden states; $W_z$ represents a weight matrix associated with an update gate; $W_r$ represents a weight matrix associated with a reset gate; $U_h$, $U_z$, $U_r$ are weight matrices; $r_t$ is the reset gate; $h_{t-1}$ represents the hidden state at the timestep t−1; $z_t$ is the update gate; $\sigma$ represents a sigmoid function.

5. The method according to claim 4, wherein the BiGRU processes sequences in two directions to respectively obtain a forward hidden state and a backward hidden state:

$h_t^{forward} = GRU_{forward}(x_t);$ $h_t^{backward} = GRU_{backward}(x_t);$ where $h_t^{forward}$ represents the forward hidden state and $h_t^{backward}$ represents the backward hidden state;

a final hidden state $\hat{h}_t$ is obtained based on the forward hidden state and the backward hidden state:

$h_t' = \left[h_t^{forward}; h_t^{backward}\right].$

6. The method according to claim 5, wherein the applying an attention mechanism to compute weighted summation results z comprises:

calculating energy scores: $e_t=score(\hat{h}_t, h_{context})$;

normalizing attention weights:

$$\alpha_t = \frac{\exp(e_t)}{\sum_{j=1}^{T} \exp(e_j)};$$

computing the weighted summation results based on the $\alpha_t$ and $$h_t \ z = \sum_{t=1}^{T} \alpha_t \cdot h_t;$$

where $e_t$ represents an energy value at a timestep t; $h_{context}$ represents a context vector; $\alpha_t$ represents an attention weight at a timestep t; $e_j$ represents an energy value at a timestep j; T represents a total number of timesteps in a sequence.

\* \* \* \* \*